United States Patent [19]
Tateishi

[11] Patent Number: 5,912,552
[45] Date of Patent: *Jun. 15, 1999

[54] DC TO DC CONVERTER WITH HIGH EFFICIENCY FOR LIGHT LOADS

[75] Inventor: Tetsuo Tateishi, Kariya, Japan

[73] Assignee: Kabushiki Kaisha Toyoda Jidoshokki Seisakusho, Aichi-Ken, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/797,990

[22] Filed: Feb. 12, 1997

[51] Int. Cl.⁶ .................................................. G05F 1/40
[52] U.S. Cl. ........................................ 323/285; 323/224
[58] Field of Search ................................. 323/224, 285; 363/21; 361/18

[56] References Cited

U.S. PATENT DOCUMENTS 3,458,798  7/1969  Fang et al. ................................. 321/43
3,579,091  5/1971  Clarke et al. ............................. 323/22

(List continued on next page.)

FOREIGN PATENT DOCUMENTS

| 0 428 377 A2 | 5/1991 | European Pat. Off. . |
| 0 428 377 B1 | 5/1991 | European Pat. Off. . |
| 60-32565 | 2/1985 | Japan . |
| 60-156269 | 8/1985 | Japan . |
| 3-113986 | 11/1991 | Japan . |
| H4-42771 | 2/1992 | Japan . |
| H4-101286 | 9/1992 | Japan . |

OTHER PUBLICATIONS

Harris Semiconductor Data Sheet, "HIP5060 Power Control IC Single Chip Power Supply," Jan. 1992.
Harris Semiconductor App Note, "HIP5060 Power Control IC Single Chip Power Supply," Apr. 1994.
Linear Technology Corporation, Application Note 25, Switching Regulator for Poets. Sep. 1987.
Linear Technology Corporation, Application Note 29, Some Thoughts on DC–DC Converters. Oct. 1988.
Linear Technology Application Note 35, Step Down Switching Regulators. Aug. 1989.
Linear Technology Corporation Data Sheet, "LT1524/LT3524 SG1525/SG3524 Regulating Pulse Width Modulator" 1990.
Linear Technology Corporation Data Sheet, "LT1432 5V High Efficiency Step–Down Switching Regulator" 1992.
Linear Technology Corporation Data Sheet, "LT1158 Half Bridge N–Channel Power MOSFET Driver" 1992 Databook.
Maxim, MAX782 Triple–Output Power–Supply Controller for Notebook Computers. May 1994.

(List continued on next page.)

*Primary Examiner*—Stuart N. Hecker
*Attorney, Agent, or Firm*—Woodcock Washburn Kurtz Mackiewicz & Norris LLP

[57] ABSTRACT

A DC to DC converter which maintains high efficiency over broad current ranges in a current mode switching regulator circuit without changing operational mode. A low ripple voltage is maintained over the entire load range and good voltage regulation is maintained with high efficiency. This is possible because the switching frequency is adjusted in accordance with the load without changing operational states, thus making it unnecessary to define plural states of operation. The timing of turning on the switch(es) varies since the switch(es) is (are) turned on when two set (ready) signals both become ready. For fixed frequency switching applications, switching pulses from a fixed frequency oscillator as a first set signal are skipped when a second set signal is not ready. On the other hand, for a variable frequency switching scheme which is implemented by driving the switching with a one-shot having a constant OFF time, the switching pulse is created after both set signals become active. A low pass filter is also used to dynamically adjust the minimum peak inductor current and to minimize ripple voltage for low load conditions so that a smaller output capacitor may be used.

35 Claims, 8 Drawing Sheets

U.S. PATENT DOCUMENTS

| | | | |
|---|---|---|---|
| 3,581,186 | 5/1971 | Weinberger | 321/43 |
| 3,582,758 | 6/1971 | Gunn | 321/47 |
| 3,624,405 | 11/1971 | Bishop et al. | 307/33 |
| 3,699,424 | 10/1972 | Hart et al. | 321/11 |
| 3,733,540 | 5/1973 | Hawkins | 321/47 |
| 3,737,755 | 6/1973 | Calkin et al. | 321/2 |
| 3,781,505 | 12/1973 | Steigerwald | 219/10.49 |
| 3,816,809 | 6/1974 | Kuster | 321/14 |
| 3,820,005 | 6/1974 | Steigerwald | 321/18 |
| 3,863,128 | 1/1975 | Wilwerding | 320/21 |
| 3,978,393 | 8/1976 | Wisner et al. | 323/17 |
| 3,989,995 | 11/1976 | Peterson | 321/2 |
| 4,013,939 | 3/1977 | Biess et al. | 323/17 |
| 4,035,710 | 7/1977 | Joyce | 363/37 |
| 4,071,884 | 1/1978 | Maigret | 363/21 |
| 4,107,596 | 8/1978 | Weaver et al. | 323/17 |
| 4,129,788 | 12/1978 | Chavannes | 307/11 |
| 4,160,288 | 7/1979 | Stuart et al. | 363/41 |
| 4,161,023 | 7/1979 | Goffeau | 363/124 |
| 4,200,830 | 4/1980 | Oughton et al. | 320/32 |
| 4,244,050 | 1/1981 | Weber et al. | 371/66 |
| 4,288,831 | 9/1981 | Dolikian | 361/92 |
| 4,301,398 | 11/1981 | Johnson | 320/21 |
| 4,302,805 | 11/1981 | Marez et al. | 363/91 |
| 4,315,304 | 2/1982 | Marez et al. | 363/49 |
| 4,323,840 | 4/1982 | Gawler | 323/287 |
| 4,326,245 | 4/1982 | Saleh | 363/79 |
| 4,395,675 | 7/1983 | Toumani | 323/271 |
| 4,413,224 | 11/1983 | Krupka et al. | 323/222 |
| 4,428,015 | 1/1984 | Nesler | 361/18 |
| 4,438,485 | 3/1984 | Voigt | 363/21 |
| 4,462,069 | 7/1984 | Becky | 363/23 |
| 4,478,174 | 10/1984 | Cates | 363/21 |
| 4,488,057 | 12/1984 | Clarke | 307/66 |
| 4,493,017 | 1/1985 | Kammiller et al. | 363/132 |
| 4,519,024 | 5/1985 | Federico et al. | 363/127 |
| 4,538,101 | 8/1985 | Shimpo et al. | 323/272 |
| 4,541,041 | 9/1985 | Park | 363/41 |
| 4,549,254 | 10/1985 | Kissel | 363/21 |
| 4,578,630 | 3/1986 | Grosch | 323/271 |
| 4,585,986 | 4/1986 | Dyer | 363/173 |
| 4,586,119 | 4/1986 | Sutton | 363/173 |
| 4,610,521 | 9/1986 | Inoue | 354/145.1 |
| 4,631,652 | 12/1986 | Wendt | 363/16 |
| 4,634,956 | 1/1987 | Davis et al. | 323/222 |
| 4,639,845 | 1/1987 | Persson et al. | 363/26 |
| 4,649,464 | 3/1987 | Shono | 363/21 |
| 4,672,303 | 6/1987 | Newton | 323/285 |
| 4,706,177 | 11/1987 | Josephson | 363/24 |
| 4,709,234 | 11/1987 | Forehand et al. | 340/856 |
| 4,709,315 | 11/1987 | Ramos | 363/21 |
| 4,709,320 | 11/1987 | Konopka | 363/56 |
| 4,713,740 | 12/1987 | Drabing | 363/17 |
| 4,716,514 | 12/1987 | Patel | 363/127 |
| 4,727,308 | 2/1988 | Huljak et al. | 323/222 |
| 4,734,771 | 3/1988 | Lendaro et al. | 358/190 |
| 4,745,535 | 5/1988 | Sugishima et al. | 363/19 |
| 4,754,385 | 6/1988 | McDade et al. | 363/16 |
| 4,761,722 | 8/1988 | Pruitt | 363/17 |
| 4,775,821 | 10/1988 | Sikora | 315/219 |
| 4,779,027 | 10/1988 | Sikora | 315/127 |
| 4,801,859 | 1/1989 | Dishner | 323/224 |
| 4,808,946 | 2/1989 | Carver et al. | 330/297 |
| 4,809,150 | 2/1989 | Limuti et al. | 363/21 |
| 4,813,066 | 3/1989 | Holtz et al. | 379/413 |
| 4,819,122 | 4/1989 | Gontowski, Jr. | 361/93 |
| 4,823,070 | 4/1989 | Nelson | 323/285 |
| 4,825,028 | 4/1989 | Smith | 219/10.55 B |
| 4,825,144 | 4/1989 | Alberkrack et al. | 323/272 |
| 4,843,532 | 6/1989 | Freedman | 363/26 |
| 4,866,587 | 9/1989 | Wadlinton | 363/16 |
| 4,870,555 | 9/1989 | White | 363/21 |
| 4,873,408 | 10/1989 | Smith et al. | 219/10.55 |
| 4,884,183 | 11/1989 | Sable | 363/41 |
| 4,902,957 | 2/1990 | Cassani et al. | 323/222 |
| 4,906,901 | 3/1990 | Carroll | 315/297 |
| 4,922,404 | 5/1990 | Ludwig et al. | 363/89 |
| 4,928,200 | 5/1990 | Redl et al. | 361/93 |
| 4,929,882 | 5/1990 | Szepesi | 323/222 |
| 4,931,716 | 6/1990 | Jovanovic et al. | 323/285 |
| 4,996,638 | 2/1991 | Orr | 363/21 |
| 5,028,861 | 7/1991 | Pace et al. | 323/284 |
| 5,034,871 | 7/1991 | Okamoto et al. | 363/15 |
| 5,066,900 | 11/1991 | Bassett | 323/224 |
| 5,068,575 | 11/1991 | Dunsmore et al. | 315/241 |
| 5,072,171 | 12/1991 | Eng | 323/283 |
| 5,081,411 | 1/1992 | Walker | 323/326 |
| 5,097,196 | 3/1992 | Schoneman | 323/222 |
| 5,099,407 | 3/1992 | Thorne | 363/37 |
| 5,128,603 | 7/1992 | Wolfel | 323/282 |
| 5,130,561 | 7/1992 | Elliott et al. | 307/31 |
| 5,134,355 | 7/1992 | Hastings | 323/211 |
| 5,138,249 | 8/1992 | Capel | 323/283 |
| 5,142,217 | 8/1992 | Gontowski, Jr. | 323/272 |
| 5,144,547 | 9/1992 | Massamoto | 363/127 |
| 5,170,333 | 12/1992 | Niwayama | 363/21 |
| 5,177,676 | 1/1993 | Inam et al. | 363/80 |
| 5,182,810 | 1/1993 | Bartling et al. | 395/750 |
| 5,184,129 | 2/1993 | Fung et al. | 341/144 |
| 5,187,425 | 2/1993 | Tanikawa | 320/31 |
| 5,193,211 | 3/1993 | Nobusawa | 455/38.2 |
| 5,229,649 | 7/1993 | Nielsen et al. | 307/31 |
| 5,237,606 | 8/1993 | Ziermann | 379/413 |
| 5,260,861 | 11/1993 | Wert | 363/25 |
| 5,272,382 | 12/1993 | Heald et al. | 307/66 |
| 5,309,078 | 5/1994 | Cameron | 318/811 |
| 5,333,176 | 7/1994 | Burke et al. | 379/58 |
| 5,349,282 | 9/1994 | McClure | 320/32 |
| 5,355,077 | 10/1994 | Kates | 323/224 |
| 5,365,118 | 11/1994 | Wilcox | 327/109 |
| 5,367,247 | 11/1994 | Blocher et al. | 323/222 |
| 5,371,666 | 12/1994 | Miller | 363/98 |
| 5,376,830 | 12/1994 | Ashley et al. | 327/134 |
| 5,382,893 | 1/1995 | Dehnel | 320/32 |
| 5,396,412 | 3/1995 | Barlage | 363/89 |
| 5,402,200 | 3/1995 | Shrinkle et al. | 360/69 |
| 5,404,094 | 4/1995 | Green et al. | 323/282 |
| 5,408,150 | 4/1995 | Wilcox | 327/108 |
| 5,414,341 | 5/1995 | Brown | 323/285 |
| 5,430,641 | 7/1995 | Kates | 363/133 |
| 5,461,301 | 10/1995 | Truong | 323/207 |
| 5,465,926 | 11/1995 | Brown | 246/34 B |
| 5,481,178 | 1/1996 | Wilcox et al. | 323/224 |
| 5,490,055 | 2/1996 | Boylan et al. | 363/285 |
| 5,498,995 | 3/1996 | Szepesi et al. | 327/538 |
| 5,521,768 | 5/1996 | Shrinkle et al. | 360/69 |
| 5,532,524 | 7/1996 | Townsley et al. | 307/64 |
| 5,534,771 | 7/1996 | Massie | 323/285 |
| 5,539,630 | 7/1996 | Pietkiewicz et al. | 363/17 |
| 5,552,695 | 9/1996 | Schwartz | 323/271 |
| 5,568,044 | 10/1996 | Bittner | 323/224 |
| 5,569,998 | 10/1996 | Cowan | 320/21 |
| 5,576,941 | 11/1996 | Nguyen et al. | 363/21 |
| 5,596,315 | 1/1997 | Olds et al. | 340/825.03 |
| 5,629,610 | 5/1997 | Pedrazzini et al. | 323/285 |
| 5,705,919 | 1/1998 | Wilcox | 323/282 |

OTHER PUBLICATIONS

Maxim, MAX786 Dual–Output Power–Supply Controller for Notebook Computers. May 1994.

Micro Linear, ML4873 Battery Power Control IC Dec. 1994.

National Semiconductor Data Sheet, LM1578/LM2578/LM3578 Switching Regulator.

RCA Data Sheet, Linear Integrated Circuits High–Reliability Slash (/) Series CA3094/ . . . CA3904A/ . . . CA3094B.

Unitrode Data Sheet, "UC1895, UC2895, UC3895 Synchronous Rectifier Buck PWM Controller," Sep. 1992.

Unitrode Data Sheet, "UC1895, UC2895, UC3895 Synchronous Rectifier Buck PWM Controller," Jan. 1993.

Archer, "Current drives synchronous rectifier," EDN Nov. 28, 1985 p. 279.

Blanc, "Designing DC/DC Converters with the Si9110 Switchmode Controller" Siliconix Inc. 1991.

Blanchard, et al., "MOSFETs, Schottky Diodes vie for LowVoltage–Supply Designs," EDN, Jun. 28, 1984.p. 197.

Borghi et al., "Discontinuous Conduction Mode Power Switching Regulator IC," PCI Oct. 1988 Proceedings, pp. 31–41.

Campbell, et al., "Some Applications of A Programmable Power Switch/Amplifier" RCA Application Note ICAN–6048.

Cassani, et al., "Sophisticated control IC Enhances 1MHz Current Controlled Regulator Performance" HFPC, May 1992, pp. 167–173.

Chetty, "IC timers control dc–dc converters" Electronics, Nov. 13, 1975 pp. 121 and 123.

Chryssis, "High–frequency switching power supplies," 1989 pp. 144–152, 180–181. Fisher, et al., Performance of Low Loss Synchronous Rectifiers in a Series–Parallel Resonant DC–DC Converter. APEC 89 Fourth Annual IEEE Applied Power Electronics Conference and Exposiiton. Mar. 13–17 1989 pp. 240–246.

Gauen, "Synchronous Rectifier Improves Step–Down Converter Efficiency" PCIM Apr. 1993 pp. 8–15.

Gontowsski & Neufeld, "Advanced New Integrated Circuits For Current–Mode Control," *PESC*, 1986, pp. 341–352.

Goodenough "Design Custom BICMOS Power/High Voltage Ics" Electronic Design Jul. 12, 1990 pp. 43–49.

Goodenough, "Dozing IC OP Amps wake up for input signal" Electronic Design. Dec. 5, 1991 pp. 49–54.

Goodenough "Synchronous Rectifier UPS PC Battery Life" Electronic Design Apr. 16, 1992 pp. 47–52.

Goodenough, "Low–Voltage Analog ICS wait in the Wings," Electronic Design, Sep. 3, 1992.

Gracie, "Intermittent Converter Saves Power," Electronic Design News, Sep. 1, 1989, p. 151.

Grant, et al., "Power Mosfets Theory and Applications" Wiley–Interscience Publication 1989.

Hnatek, "Design of Solid State Power Supplies" Third Edition, 1989, pp. 65–70.

Hodgins and Wittlinger, "Harris Intelligent Power," Application Note AN9212.1 (1992), pp. 11–191 –11–197.

HoroWitz & Hill, "The Art of Electronics," Cambridge University Press. 1989, pp. 356–360.

Huffman, "Components, configuration, and common sense are keys to efficient regulators" EDN, Jul. 22, 1993 pp. 106–120.

Jamieson, "Technical Support Package on Synchronism Half–Wave Rectifier," *NASA TECH* Brief vol. 13, No. 7., Item #15, Jul. 1989, pp. 1–3.

Japanese Utility Model Publication No. 4–101286, "High Efficiency Power Supply Circuit," filed Jan. 17, 1991, published Sep. 1, 1992. (no translation).

Kerridge, "Battery power breeds efficient regulators" EDN Mar. 18, 1993 pp. 103–108.

La Duca, et al. "Improved Single–Ended Regulated DC/DC Converter Circuit" PESC'75 IEEE Power Electronic Specialists Conference–1975 Jun. 9–11, 1975 pp. 177–187.

Lee et al, "Design of Switching Regulator with Combined FM and On–Off Control," *IEEE Transactions on Aerospace and Electronic Systems*, vol. AES–22, No. 6, Nov. 1986, pp. 725–731.

Lee, et al., "A 580 KHZ switching regulator using on–off control" Journal of the Institution of Electronic and Radio Engineers, vol. 57., No. 5 pp. 221–226. Sep./Oct. 1987.

Mansmann, et al., "Maximizing the Impact of Power IC's via a Time to Market CAD Driven Power ASIC Strategy" APEC'92 Seventh Annual Applied Power Electronics Conference and Exposition Feb. 23–27, 1992 pp. 23–27.

Massey, et al, "High Voltage Single–Ended DC–DC Converter" PESC'77 Record IEEE Power Electronics Specialists Conference Jun. 14–16, 1977 pp. 156–159.

Meakin, "The LM3578 Switching Power Regulator" Electronic Engineering Jul. 1986.

Myers, "200–kHz Power FET Technology in New Modular Power Supplies," Hewlett–Packard Journal, Aug. 1981.

Patel, "Using Bipolar Synchronous Rectifiers Improves Power Supply Efficiency, "The Power Source Conference, proceedings, Nov. 27–29, 1984.

Patel, "Bipolar synchronous rectifiers cut supply losses" EDN Apr. 4, 1985.

Quinnell, "Analog IC combines five functions for battery power management," EDN Apr. 23, 1992.

Redl, et al "Frequency Stablization and Synchronization of Free–Running Current–Mode Controlled Converters," *PESC"86 Record* pp. 519–530.

Redl et al, Overload–Protection Methods For Switching––Mode DC/DC Converters: Classification, Analysis, and Improvements, *PESC '87 Record,* pp. 107–118.

Shepard, "Powering portable systems," EDN, Nov. 5, 1992 pp. 73–74.

Sokal & Redl, "Control Algorhythms and Circuit Designs For Optimally Fly Back–Charging and Energy–Storage Capacitor," (e.g., for a flash lamp), *EEEE* Catalog No. CH2853–0/90/0000/0295,1990, pp. 295–301.

Steigerwald, "High Frequency Resonant Transistor DC–DC Converters." IEEE Transaction on Industrial Electronics., vol. IE–31., No. 2., May 1984 pp. 181–191.

Taylor, "Fly Back Converter," Electronic Engineering, Jul., 1976.

Uchida, "Control Circuit For Switching Regulator," Japanese Inventor Associated Disclosed Technology Publication No. 92–2362, published Feb. 15, 1992 (with translation).

Wilcox, "The LT1158: Low Voltage, N–Channel Bridge Design Made Easy" Linear Technology vol. II No. 1, Feb. 1992 pp. 1–5.

Williams, "Micropower circuits assist low–current signal conditioning," EDN Aug. 6, 1987 pp. 123–132.

Williams, et al., "Precise converter designs enhance system performance," EDN Oct. 13, 1988 pp. 175–185.

Williams, et al., "Proper instrumentation eases low–power DC/DC–converter design," EDN Oct. 27, 1988 pp. 285–291.

Williams, et al., "Design dc/dc converters for power conservation and efficiency," EDN Nov. 10, 1988 pp. 209–224.

Williams, et al., "Switched–capacitor networks simplify dc/dc–converter designs," EDN Nov. 24, 1988.

Williams, "Basic principles and ingenious circuits yield stout switchers," EDN Jan. 18, 1990 pp. 151–166.

Williams, "Designing supplies for powering LCD backlighting," EDN Oct. 29, 1992 pp. 125–136.

Williams, et al., "Synchronized regulator produces coherent noise," EDN Design Ideas.

Williams, "1.5 to 5V converter supplies 200 mA," EDN Oct. 15, 1992 pp. 139–140.

"Using Bipolar Synchronous Rectifiers Improves Power Supply Efficiency," pp. 12–88–94, Unitrode Semiconductor Products, Jun. 1985.

Dell schematic, Saturn 4.8V Main Converter. Oct. 1, 1992.

DC TO DC CONVERTER WITH HIGH EFFICIENCY FOR LIGHT LOADS

BACKGROUND OF THE INVENTION

1. Field of the Invention

The present invention relates to a DC to DC converter which is highly efficient for light loads and, more particularly, to a DC to DC converter having a current mode switching voltage regulator circuit and a feedback control path which regulates the switching frequency over broad current ranges based on the load without changing operational modes so that improved switching efficiency is made possible.

2. Brief Description of the Prior Art

A DC to DC converter is an apparatus that converts an input DC voltage into a constant regulated output DC voltage for application to a load. DC to DC converters of the type to which the present invention is directed employ a switching voltage regulator to convert the input DC voltage into the output DC voltage. The switching voltage regulator employs a switch, such as a power MOSFET, coupled either in series or in parallel with the load. The voltage applied to the load is regulated by controlling the ON and OFF time of the switch using a control circuit which varies the duty cycle applied to the switch based on the difference between the input DC voltage and the output DC voltage. The switching voltage regulator further employs inductive energy storage elements for converting the switched current pulses from the switch into a steady load current.

The duty cycle of the switch can be varied using a fixed frequency approach in which the frequency of the pulse stream is fixed and the ON or OFF time of each pulse is varied, or using a variable frequency approach in which the ON or OFF time of each pulse is fixed but the pulse stream frequency is varied. In either case, the output voltage is increased by increasing the ON time of the switch and is decreased by decreasing the ON time of the switch. A feedback circuit is used to accordingly vary the ON time of the switch so that a constant output voltage is maintained. The present invention may use either approach.

When the DC to DC converter is used in battery operated devices such as laptop and notebook computers and other hand-held electronic devices, the efficiency of the voltage regulator becomes critical to the effort to extend battery life. Typically, the efficiency of the voltage regulator decreases at low output current or low load conditions since the efficiency is generally a function of output current drawn by the load and since the losses associated with the operation of the switching voltage regulator become a larger percentage of the overall energy dissipation.

Numerous techniques have been proposed to improve the efficiency of voltage regulators for low load conditions. For example, in Unexamined Japanese Patent Application No. H4-42771, published Feb. 13, 1992, a DC to DC converter is disclosed which drives the duty cycle (PWM) control circuit intermittently during light load conditions so as to decrease dissipation caused by switching during such light load conditions. The output voltage is maintained in a predetermined range defined by upper and lower voltage thresholds when the output power of the DC to DC converter is below a low power threshold by turning off the switch control circuit so long as the output voltage level is above the lower voltage threshold. When the output capacitor discharges below the lower voltage threshold, the switch control circuit is again activated to cause normal duty cycle switching until the output DC voltage exceeds the upper voltage threshold. The switch control circuit is then deactivated until the output DC voltage again falls below the lower voltage threshold. This operation is repeated so long as the output power to the load remains below the low power threshold. Once the low power threshold is exceeded, normal duty cycle switching operation is resumed. Since less switching energy is dissipated for light loads, efficiency of the voltage regulator is improved.

FIG. 1 illustrates the step-down voltage regulator 10 of FIG. 2 of U.S. Pat. No. 5,481,178, which is characterized by a pair of synchronously switched MOSFETs Q1 and Q2 connected between the input DC voltage terminal $V_{in}$ and ground. Switching MOSFETs Q1 and Q2 are driven by driving elements 12 and 14, respectively, in a push-pull arrangement, and output power is provided to the output DC terminal via inductor L. The switching control circuit comprises comparators 16 and 18, constant OFF time one-shot 20, inverter 22, and logic gates NAND1 and AND1. A constant current source I1 and hysteretic comparator 24 are also provided for providing improved efficiency at low average current levels. During operation, the constant current source I1 and comparator 24 cause the push-pull switch comprising MOSFETs Q1 and Q2 to go into a so-called "sleep" mode in which both MOSFETs Q1 and Q2 are simultaneously OFF. The "sleep" mode is initiated when the feedback voltage $V_{FB}$ is greater than $V_{REF}$, indicating that the output DC voltage $V_{OUT}$ is in excess of the regulated voltage and that the output can be maintained substantially at the regulated voltage by output capacitor $C_{OUT}$. The overvoltage condition is intentionally induced at low average output currents by constant current source I1. In the sleep mode, other circuit elements may be deactivated as well. When it is detected by comparator 24 that $V_{FB}$ is less than $V_{REF}$, the voltage regulator 10 wakes from the sleep mode and normal duty cycle switching resumes until the output capacitor is again overcharged and the "sleep" mode may be entered again.

The voltage regulator 10 of prior art FIG. 1 is generally undesirable because its design requires more current to be supplied to inductor L than is necessary to maintain the output DC voltage at the regulated voltage. Such over driving of the output capacitor $C_{OUT}$ leads to increased ripple voltage. A highly efficient voltage regulator is desired which minimizes the ripple voltage during low power conditions.

FIG. 2 illustrates the prior art voltage regulator 30 described in U.S. patent application Ser. No. 08/629,573, filed Apr. 9, 1996, and assigned to the present assignee. Voltage regulator 30 improves operating efficiency by providing a light load mode in which, rather than turning off the switching transistors for a "sleep" state, the rate of switching of the switching transistors is reduced in accordance with the load when a light load condition is detected. As illustrated, voltage regulator 30 includes synchronous switching transistors 32 and 34, comparator 36 for comparing the output DC voltage drop across $R_2$ to a reference voltage $V_{REF}$, switching control circuit 38, and feedback comparators 40 and 42. During operation, if the inductor current $I_L$ is detected by feedback comparator 40 to be greater than a threshold, comparator 40 outputs a level indicating that the output current is high. On the other hand, if the inductor current $I_L$ is detected by feedback comparator 42 to be less than another, lower, threshold, comparator 42 outputs a level indicating that output current is low. Comparator 36 monitors the voltage drop across $R_2$, which is indicative of the output voltage $V_{OUT}$ and provides another control signal to switch control circuit 38. Switch control circuit 38 then turns ON switching transistor 32 when the control signal is received from comparator 36, and turns OFF switching transistor when the control signal is received from comparator 40. As a result, the duty cycle timing is adjusted in accordance with the rate of change of the inductor current, which is, in turn, related to the level of the load.

It is desired to provide an alternative voltage regulator in which the duty signal may be more accurately controlled for all load current levels. For example, it is desired that the same signal be used to determine the load condition and to reduce the switching frequency so that no offset error is introduced as in the voltage regulator of prior art FIG. 1. It is also desired to provide a technique to overcome the drawbacks of the voltage regulator of FIG. 2 by further reducing ripple voltage when the input DC voltage and output DC voltage are approximately the same. The present invention has been designed to address these needs.

SUMMARY OF THE INVENTION

The present invention addresses the afore-mentioned problems in the prior art by providing a DC to DC converter which maintains high efficiency over broad current ranges in a current mode switching regulator circuit without changing operational mode. A low ripple voltage is maintained over the entire load range and good voltage regulation is maintained with high efficiency by adjusting the switching frequency in accordance with the load without changing operational states, thus making it unnecessary to define plural states of operation. The timing of turning on the switch(es) varies since the switch(es) is (are) turned on when two set (ready) signals both become ready. For fixed frequency switching applications, switching pulses from a fixed frequency oscillator as a first set signal are skipped when a second set signal is not ready. On the other hand, for a variable frequency switching scheme which is implemented by driving the switching with a one-shot having a constant OFF time, the switching pulse is created after both set signals become active. A low pass filter is also used to dynamically adjust the minimum peak inductor current and to minimize ripple voltage for low load conditions so that a smaller output capacitor may be used.

In particular, a switching voltage regulator in accordance with a preferred embodiment of the invention comprises an output terminal connected to a load, an output circuit including an inductor for storing energy and an output capacitor coupled to the output terminal which supplies a regulated voltage to the output terminal, switching means coupled to the inductor so as to alternate an input voltage applied to the inductor in response to a switching control signal, rectifying means coupled to the inductor so as to freewheel current in the inductor and substantially prevent a reverse current through the inductor from the output terminal, and a switching control circuit which provides the switching control signal to the switching means so as to maintain the regulated voltage to the output terminal. In accordance with the invention, the switching control circuit comprises means for monitoring a voltage provided to the output terminal and for generating a first feedback signal which indicates a target inductor current for providing the regulated voltage to the output terminal, and driving means responsive to the first feedback signal for selectively supplying driving pulses to the switching means so as to control duty cycle switching of the switching means. The frequency of the switching is varied by the switching means by an amount proportional to a load current. This is possible because the switching means is turned ON by waiting for two set (ready) signals to both become ready. One of the set signals represents a predetermined time constant, while the other set signal represents a time constant according to the load condition. Since the first feedback signal is used to control the duty cycle and to determine light load conditions, no error caused by current and voltage offsets is introduced into the determination. Also, a light load threshold may be set more accurately.

In a preferred implementation of the invention, the driving means comprises means for monitoring an inductor current output by the inductor to the output terminal and for generating a second feedback signal which indicates the inductor current. Gating means are provided which are responsive to first, second, and third control signals for outputting the switching control signal to close the switching means when the first and second control signals are active and for outputting the switching control signal to open the switching means when the third control signal is active. A pulse generating means provides the first control signal to the gating means, while the third control signal is provided to the gating means in response to the first and second feedback signals, where the third control signal is active when the second feedback signal has a greater value than the first feedback signal. Finally, means are provided which are responsive to the first feedback signal for providing the second control signal to the gating means, where the second control signal is inactive when the first feedback signal has a value less than a predetermined value indicative of a light load. In short, the first control signal from the pulse generating means is only provided to the driving circuitry for the switching means when the target peak current for the regulated voltage exceeds a value indicative of a normal load; for lighter loads, the second control signal instead of the first control signal determines the timing of turning ON the switching means.

The switching voltage regulator of the invention may be implemented as a step down voltage regulator, where the regulated voltage is less than the input terminal voltage, as a step up voltage regulator, where the regulated voltage is greater than the input terminal voltage, and/or as a buck-boost voltage regulator, where the regulated voltage is selectively less than or greater than the input terminal voltage. Depending upon the configuration, various rectifying circuits may also be used. For example, a down converting switching voltage regulator in a presently preferred embodiment of the invention may be configured such that one end of the inductor is connected to the rectifying circuit and the switching means and the other end of the inductor is connected to the output terminal, while the switching means is connected between the input terminal and rectifying circuit. In such a configuration, the rectifying circuit may be an asynchronous rectifier comprising a diode connected between ground and the inductor or a synchronous rectifier comprising a switching transistor connected between ground and a junction of the switching means with the inductor, a comparator which compares either the voltage across the switching means or the second feedback signal to a zero crossing reference voltage to generate a reverse polarity signal which indicates the polarity of the inductor current, and a gate responsive to the reverse polarity signal and a driving signal from the driving means so as to disable the switching transistor when the reverse polarity signal indicates that the inductor current is flowing from the output terminal to the inductor and to switch the switching transistor in inverse phase with the switching means when the reverse polarity signal indicates that the inductor current is flowing to the output terminal from the inductor.

In accordance with another feature of the invention, a low pass filter is provided to filter the first feedback signal so as to dynamically adjust the minimum peak inductor current. The low pass filter of the invention prevents the output capacitor from charging substantially beyond the regulated voltage when $V_{IN}-V_{out}$ is small, thereby further improving the ripple voltage. The low pass filter also guarantees the minimum peak current in order to maintain a preferable frequency.

In a particular implementation of the invention, the gating means comprises an AND gate which receives the first and second control signals at first and second inputs thereof, and an RS flip-flop which receives an output of the AND gate at a set input thereof and the third control signal at a reset input thereof. For fixed frequency switching applications, the pulse generating means is preferably an oscillator in which switching pulses output as a first set signal are skipped when a second set signal is not ready. On the other hand, for variable frequency switching applications, the pulse generating means is preferably a constant OFF time one-shot responsive to the third control signal to provide a constant duration OFF time pulse to the set input of the RS flip-flop for driving the switching means.

The scope of the invention also includes a method of controlling a switching voltage regulator comprising an output terminal connected to a load, an output circuit including an inductor for storing energy an output capacitor coupled to the output terminal which supplies a regulated voltage to the output terminal, switching means coupled to the inductor for alternating an input voltage applied to the inductor in response to a switching control signal, and rectifying means coupled to the inductor for freewheeling current in the inductor and substantially preventing a reverse current through the inductor from the output terminal, the method comprising the steps of:

monitoring a voltage provided to the output terminal and for generating a first feedback signal which indicates a target inductor current for providing the regulated voltage to the output terminal;

selectively supplying driving pulses to control duty cycle switching of the switching means so as to maintain the regulated voltage to the output terminal in accordance with the first feedback signal; and varying a frequency of the switching by the switching means by an amount proportional to a load current when the first feedback signal has a value less than a predetermined threshold.

Preferably, the method of the invention further comprises the step of low pass filtering the first feedback signal. The low pass filtering step dynamically adjusts the minimum peak inductor current and minimizes ripple voltage during low load conditions since the switching transistors are turned OFF at a lower peak inductor current. A smaller output capacitor may also be used since the filtering mitigates the effect of a larger voltage change across a smaller capacitor during capacitor charging.

BRIEF DESCRIPTION OF THE DRAWINGS

The objects and advantages of the invention will become more apparent and more readily appreciated from the following detailed description of presently preferred exemplary embodiments of the invention taken in conjunction with the accompanying drawings of which.

DETAILED DESCRIPTION OF PRESENTLY PREFERRED EMBODIMENTS

A DC to DC converter with the above-mentioned beneficial features in accordance with presently preferred exemplary embodiments of the invention will be described below with reference to FIGS. 3–8. It will be appreciated by those of ordinary skill in the art that the description given herein with respect to those figures is for exemplary purposes only and is not intended in any way to limit the scope of the invention. All questions regarding the scope of the invention may be resolved by referring to the appended claims.

Figure 3:
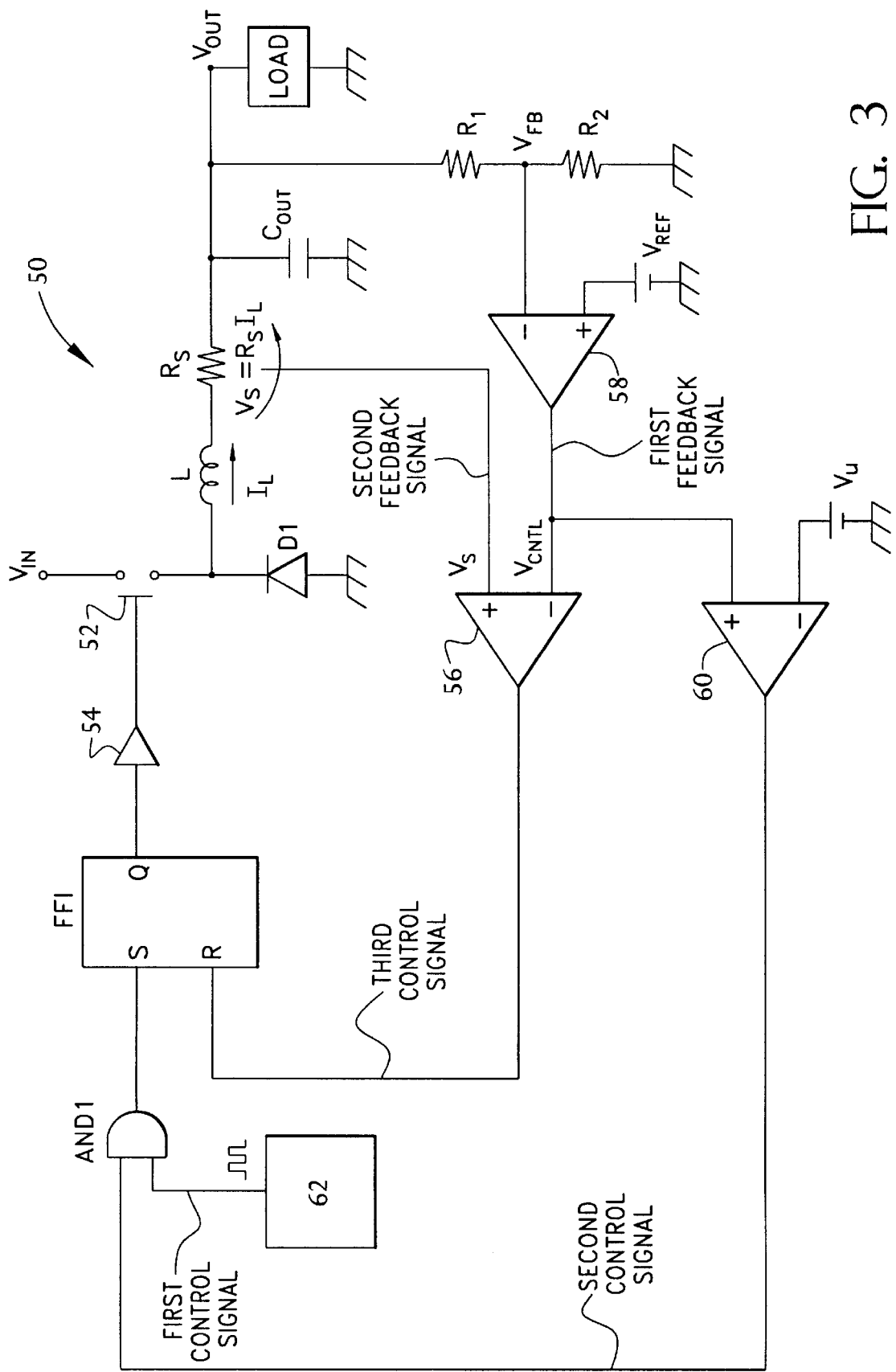
FIG. 3 illustrates a generalized block diagram of a DC to DC converter in accordance with the invention.

FIG. 3 illustrates a generalized block diagram of a DC to DC converter 50 in accordance with the invention. As illustrated, DC to DC converter 50 includes a switch 52 for selectively applying input voltage $V_{in}$ to the inductor L. Switch 52 is preferably an N-MOS or P-MOS transistor which receives a driving signal from an N-MOS or P-MOS driving buffer 54 which is generated in accordance with the techniques of the invention. In accordance with techniques well known to those skilled in the art, diode D1 functions as a rectifying circuit which freewheels the inductor current and prevents the inductor current from flowing to ground when switch 52 is open. Current flowing in inductor L while switch 52 is closed is passed through sensing resistor $R_s$, and passed to output terminal $V_{out}$ for application to the load. Capacitor $C_{out}$ stores energy supplied from the inductor in a conventional manner and drives the load in the absence of a driving current $I_L$ from the inductor L. As will be appreciated by those skilled in the art, while FIG. 3 illustrates a non-synchronous DC—DC converter, the present invention may also be implemented as a synchronous DC—DC converter, as in the embodiments of FIGS. 4 and 5.

Two feedback paths are provided in the voltage regulator circuit in accordance with the invention. In the first feedback path, a first feedback signal, $V_{cnt1}$, representing the target peak inductor current for the regulated voltage, is generated by comparing the detected output voltage $V_{FB}$ detected across the voltage divider comprising resistors $R_1$ and $R_2$ with a reference voltage $V_{REF}$ using differential amplifier 58. For a step down voltage regulator in which 5 V<$V_{IN}$<25 V and 1.3 V<$V_{out}$ <3.6 V, for example, $V_{REF}$ may be approximately 1.2 V. In the second feedback path, the second feedback voltage signal, $V_s$, representing the voltage across resistor $R_s$ (=$V_s/I_L$), is measured and is compared with $V_{cnt1}$ by comparator 56. Comparator 56 compares $V_{cnt1}$ with $V_s$ to generate a reset signal to open (turn off) switch 52 by resetting RS flip-flop FF1 when $V_s$>$V_{ct1}$. In a preferred embodiment, FF1 gives priority to the reset signal over the set signal. Comparator 60, on the other hand, compares $V_{cnt1}$ with a light load reference voltage, $V_{LL}$, and outputs a signal which represents a time constant according to the load condition. During operation, when $V_{cnt1}$ falls below $V_{LL}$, comparator 60 outputs a low level signal. AND1 waits for both set signals from pulse generator 62 and the output of comparator 60 to go high to apply set pulses to the set input of FF1. As a result, the Q output of FF1 is set less frequently.

During normal operation of the voltage regulator 50 of FIG. 3, when $V_{cnt1}$ is determined by comparator 60 to be equal to or larger than $V_{LL}$, the output of comparator 60 is maintained at a high level so that AND1 outputs set pulses from set pulse generator 62 at the predetermined timing to the set input of FF1. Switch 52 is turned ON in accordance with the set pulses received from set pulse generator 62. When FF1 is set and hence switch 52 is closed, the inductor L is connected to $V_{in}$ and the current flow through the inductor L ramps up. When this inductor current $I_L$ becomes as large as $V_{cnt1}/R_s$, comparator 56 outputs a high level to reset FF1 and to open switch 52, forcing freewheeling current to flow through the diode D1 whereby the inductor current $I_L$ starts to decline. Then, when a high level set pulse is received from set pulse generator 62, FF1 is set again and switch 52 is closed. This operation cycle is repeated throughout normal operation.

If the output voltage is increased, as when the device driven by voltage regulator 50 is inactive, the feedback voltage $V_{FB}$ increases, and the output of differential amplifier 58 decreases, as does the level of $V_{cnt1}$. This decreases the target peak inductor current for comparison to $V_s$, by comparator 56, thus causing inductor L to conduct for a shorter time before a reset signal is received from comparator 56. On the other hand, if the output voltage is decreased, as when the device driven by voltage regulator 50 becomes active again, the feedback voltage $V_{FB}$ decreases, and the output of differential amplifier 58 increases, as does the level of $V_{cnt1}$, This increases the target peak inductor current for comparison to $V_S$ by comparator 56, thus causing inductor L to conduct for a longer time before a reset signal is received from comparator 56. By this procedure, the output voltage is kept substantially constant.

On the other hand, when load current is further decreased, $V_{cnt1}$ becomes less than $V_{LL}$, the output of comparator 60 is changed from high to low, and AND1 outputs a low level signal. In this light-load condition, because the charge flowing out from $C_{out}$ to the load is much smaller than the charge delivered by a single inductor current pulse, $V_{cnt1}$ remains less than $V_{LL}$ even after another set signal is generated by set pulse generator 62. The output of comparator 60 thus maintains a low level, and FF1 is not yet set. Then, after $V_{out}$ slowly decays and $V_{cnt1}$ exceeds $V_{LL}$, comparator 60 outputs a high level signal which allows the set pulses from set pulse generator 62 to set FF1. This sequence reduces the switching frequency of switch 52, and hence results in higher efficiency of the DC—DC converter in the light-load condition. These operational cycles are repeated so long as the load is light. This operation serves to reduce the operational frequency of the switch when the load is light, thereby suppressing drive loss and switching loss of power MOSFETs.

Figure 4:
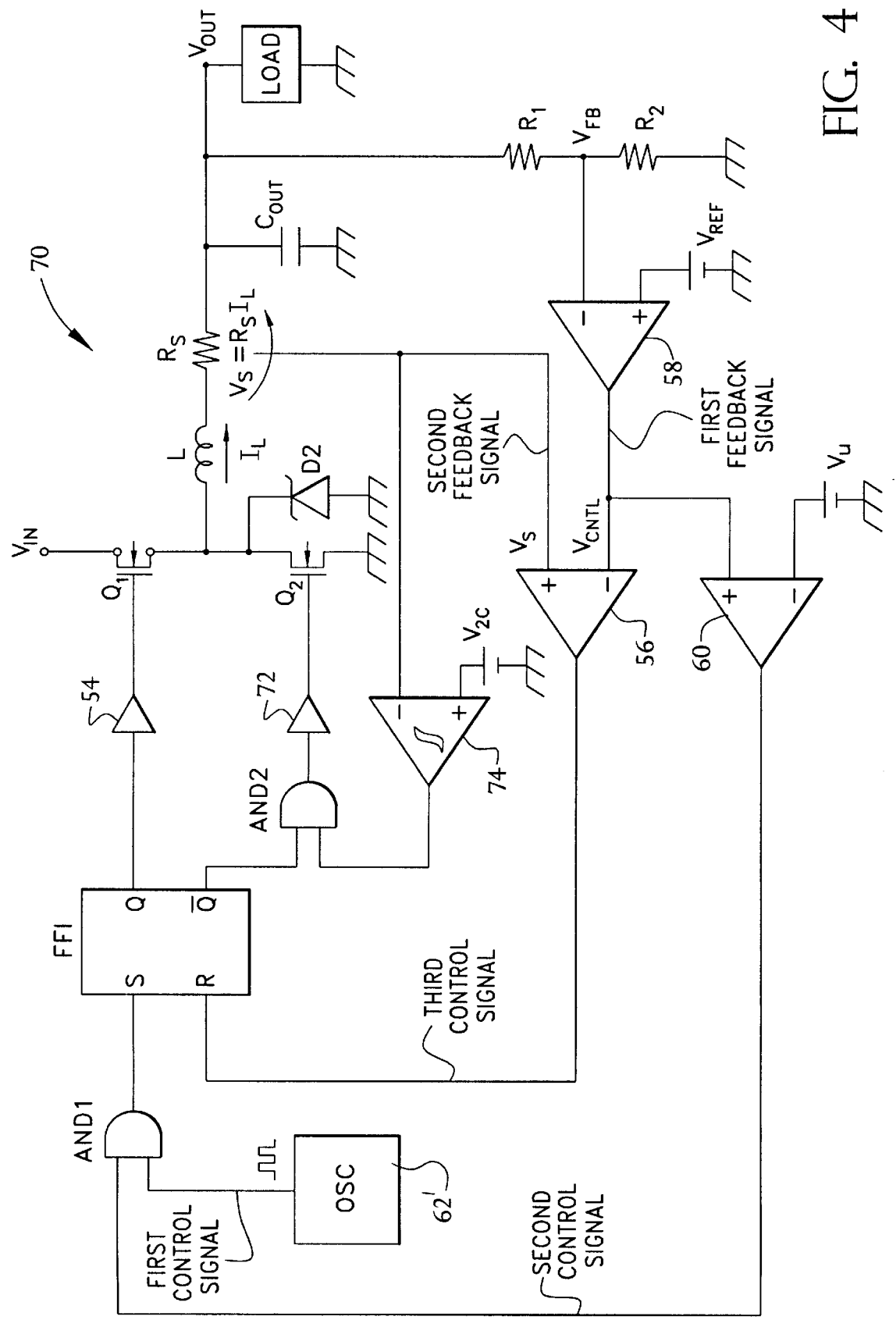
FIG. 4 illustrates a fixed frequency DC to DC down converter in accordance with a first embodiment of the invention.

FIG. 4 illustrates a fixed frequency DC to DC down converter 70 in accordance with a first embodiment of the invention. In FIG. 4, set pulse generator 62 is synchronized to an internal oscillator 62' and switch 52 is a transistor Q1. Rectifying diode D1 is also replaced by a synchronous rectifying circuit in order to improve its power conversion efficiency. As shown in FIG. 4, rectifying transistor Q2 is added in parallel to the Schottky diode D2. Transistor Q2 is controlled in opposite phase to transistor Q1 in a manner that exactly traces the ON timing of the freewheeling diode D1 of FIG. 3. In particular, when Q1 is OFF (FF1 is in RESET status), transistor Q2 is ON and inductor current $I_L$ is flowing toward the output terminal. When inductor current is flowing toward the output, the output of hysteretic comparator 74, which compares the current to a zero crossing voltage (which may be zero or an offset $V_{zc}$), is high, thereby allowing driving signals from the not Q output of FF1 to pass through AND2 to driving buffer 72 to drive transistor Q2. On the other hand, when inductor current is flowing out from the output, the output of hysteretic comparator 74 is low, thereby preventing driving signals from the not Q output of FF1 from passing through AND2 to drive transistor Q2. This prevents reversal current from being drawn from the output capacitor, thereby further improving efficiency.

Figure 5:
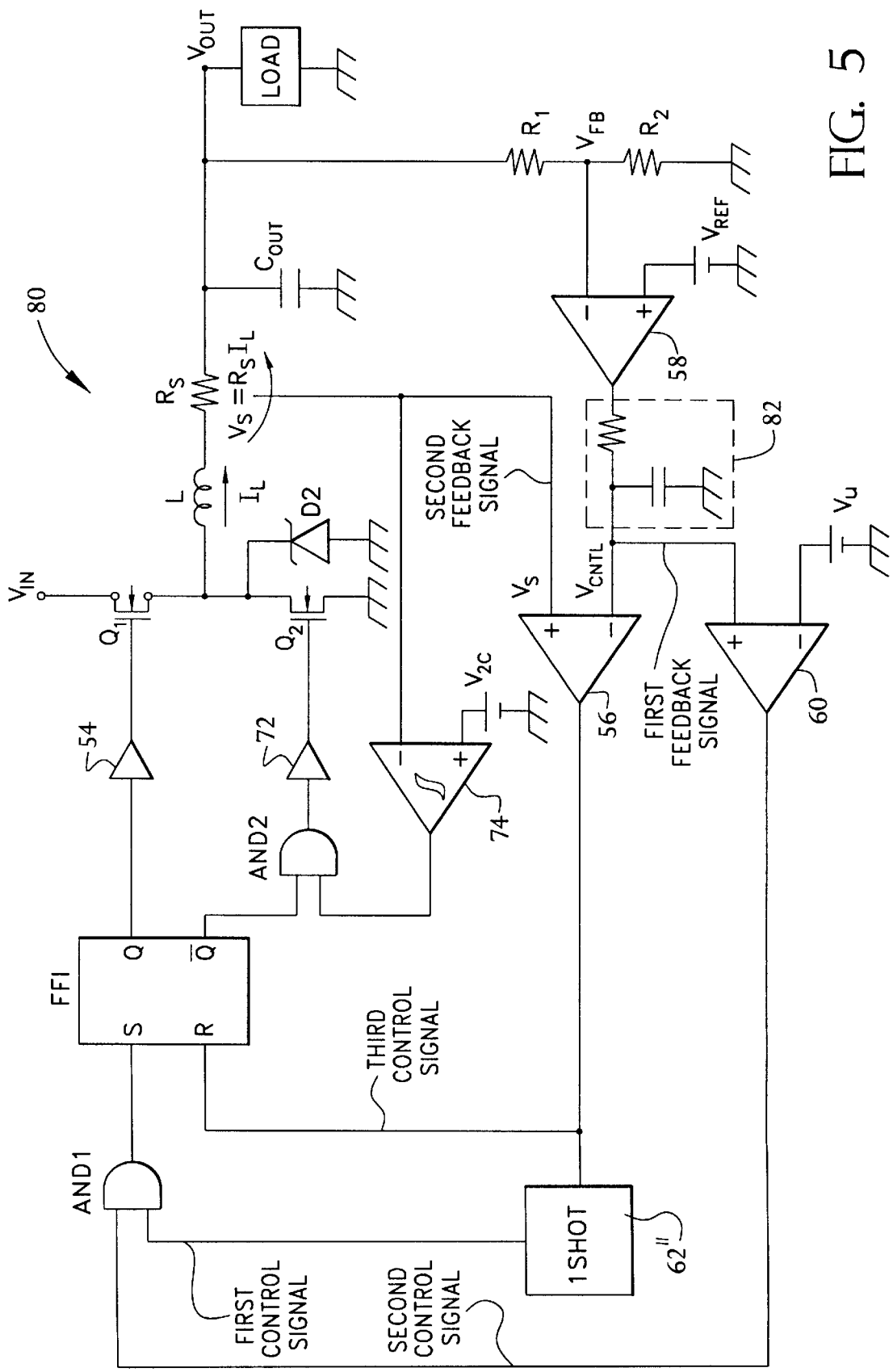
FIG. 5 illustrates a variable frequency DC to DC down converter in accordance with a second embodiment of the invention.

FIG. 5 illustrates a variable frequency DC to DC down converter 80 in accordance with a second embodiment of the invention. In this embodiment, set pulse generator 62 is a constant OFF time one-shot 62" which is responsive to the output of comparator 56 to provide constant OFF time pulses to the set input of FF1 via AND1. Since an oscillator is not used and the switching frequency varies with the duration of the ON time of the signal from comparator 56, this approach is referred to as a variable frequency approach and is generally more energy efficient since an oscillator is not needed. The embodiment of FIG. 5 also uses a synchronous rectifier circuit, although a rectifying circuit of the type illustrated in FIG. 3 could also be used.

Figure 1:
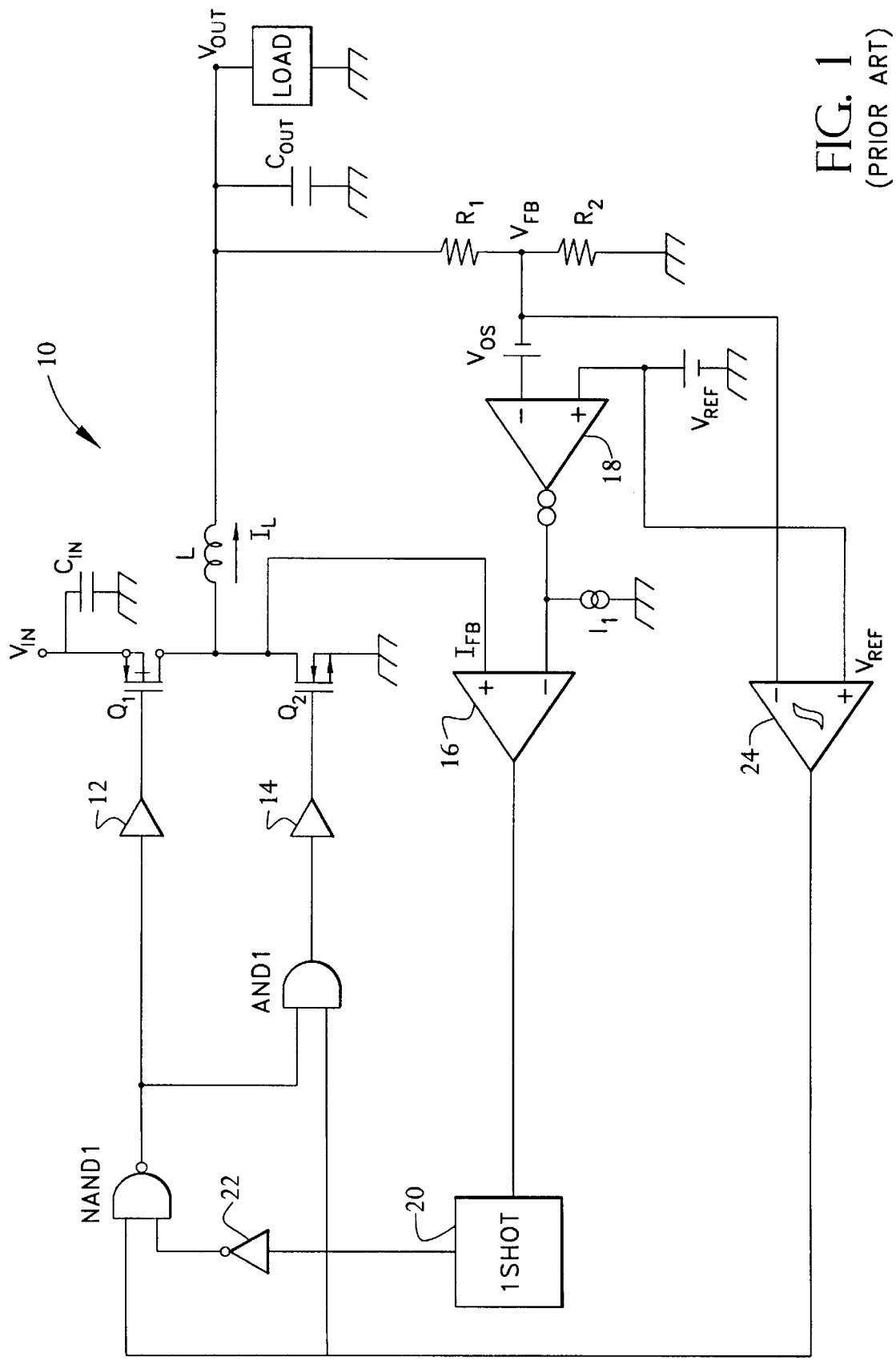
FIG. 1 illustrates a prior art DC to DC converter of the type described in U.S. Pat. No. 5,481,178.
Figure 2:
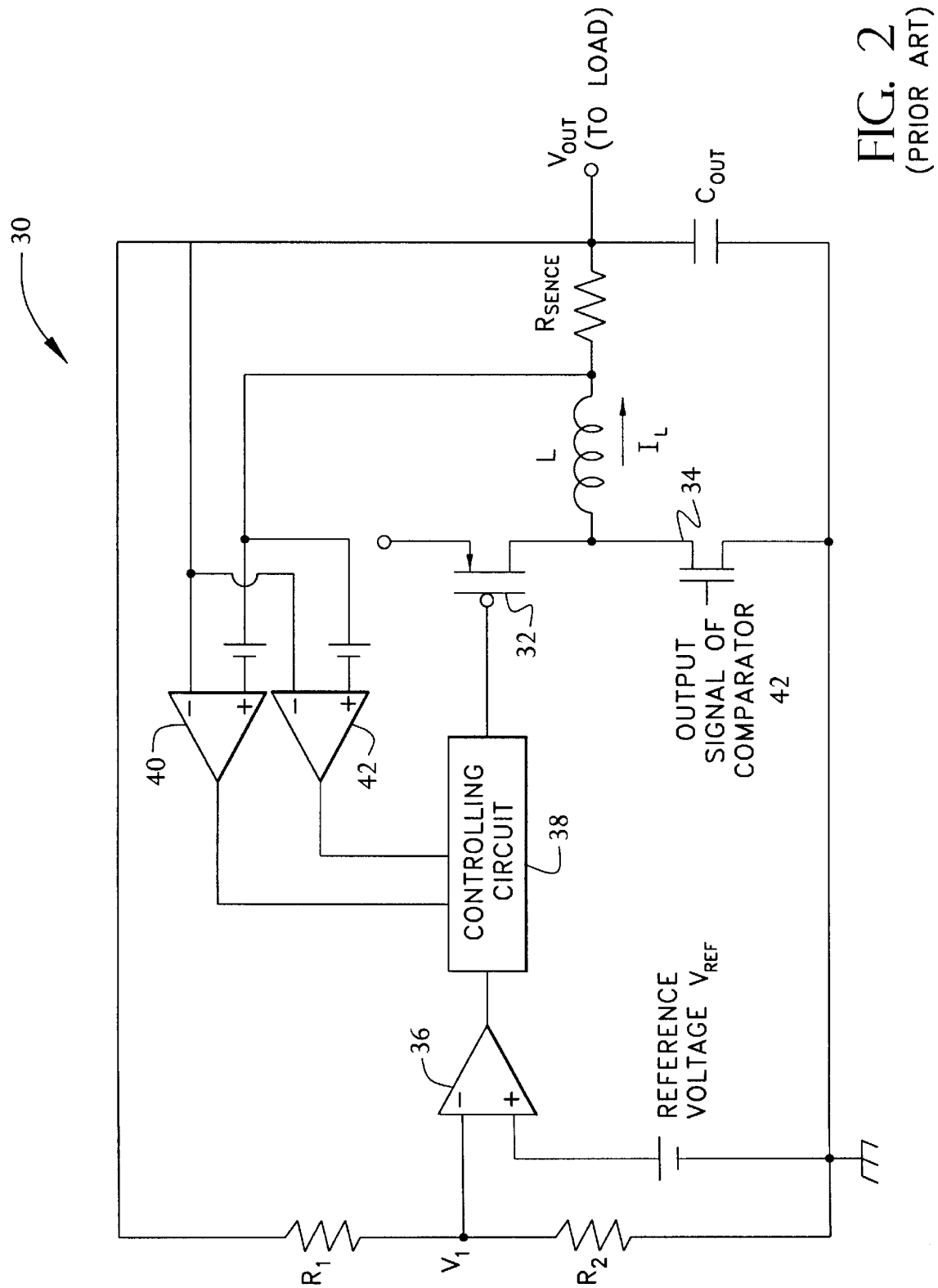
FIG. 2 illustrates a prior art DC to DC converter of the type described in U.S. patent application No. 08/629,573, also assigned to the present assignee.
Figure 6:
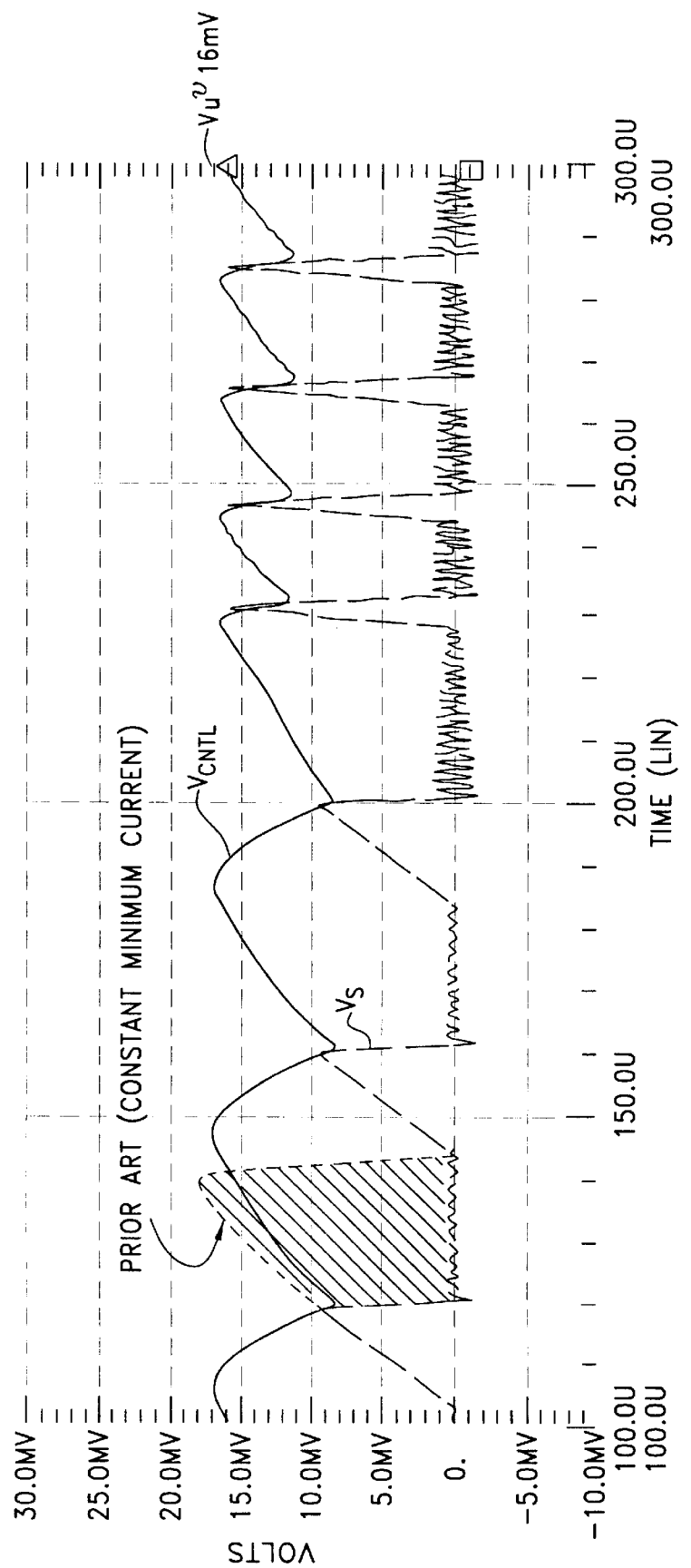
FIG. 6 is a timing diagram illustrating the effects of the low pass filter on the output voltage of the circuit of FIG. 5.

In contrast with the prior art voltage regulators of the type described above with reference to FIGS. 1 and 2, it is not necessary in the embodiments of FIGS. 3–5 to raise the inductor current until it reaches a predetermined value. As noted above, such prior art approaches tend to deliver too much charge to the output capacitor $C_{out}$ in cases where the voltage difference between $V_{in}$ and $V_{out}$ is small, thus causing undesirably large ripple voltage. As shown in FIG. 5, the voltage regulator 50 of FIG. 3 may be modified to overcome this drawback by adding filtering circuitry 82 in the output line of the differential amplifier 58. Then, starting with a condition that FF1 is set and Q1 is ON, the inductor L is connected to $V_{in}$, and the current $I_L$ flowing through inductor L ramps up. This current $I_L$ charges the output capacitor $C_{out}$ and the voltage across $C_{out}$ increases. As shown in FIG. 6, if the voltage difference between $V_{in}$. and $V_{out}$ is small, the output level of the differential amplifier 58 ($V_{cnt1}$) decreases faster than VS increases, thereby preventing the capacitor $C_{out}$ from charging to a higher value and causing increased ripple current. By choosing appropriate time constants for low pass filter 82, the output ripple voltage can be kept constant regardless of the $V_{in}$ to $V_{out}$ voltage difference. As a result, it is not necessary to overcharge the output capacitor $C_{out}$ to include the shaded area illustrated in FIG. 6. On the other hand, when the voltage difference between $V_{in}$ and $V_{out}$ is large, $V_{cnt1}$ is kept at approximately $V_{LL}$ until $V_s$ comes up to $V_{cnt1}$. As a result, a minimum charge is delivered to the output capacitor $C_{out}$ to maintain preferable frequency characteristics.

Figure 7:
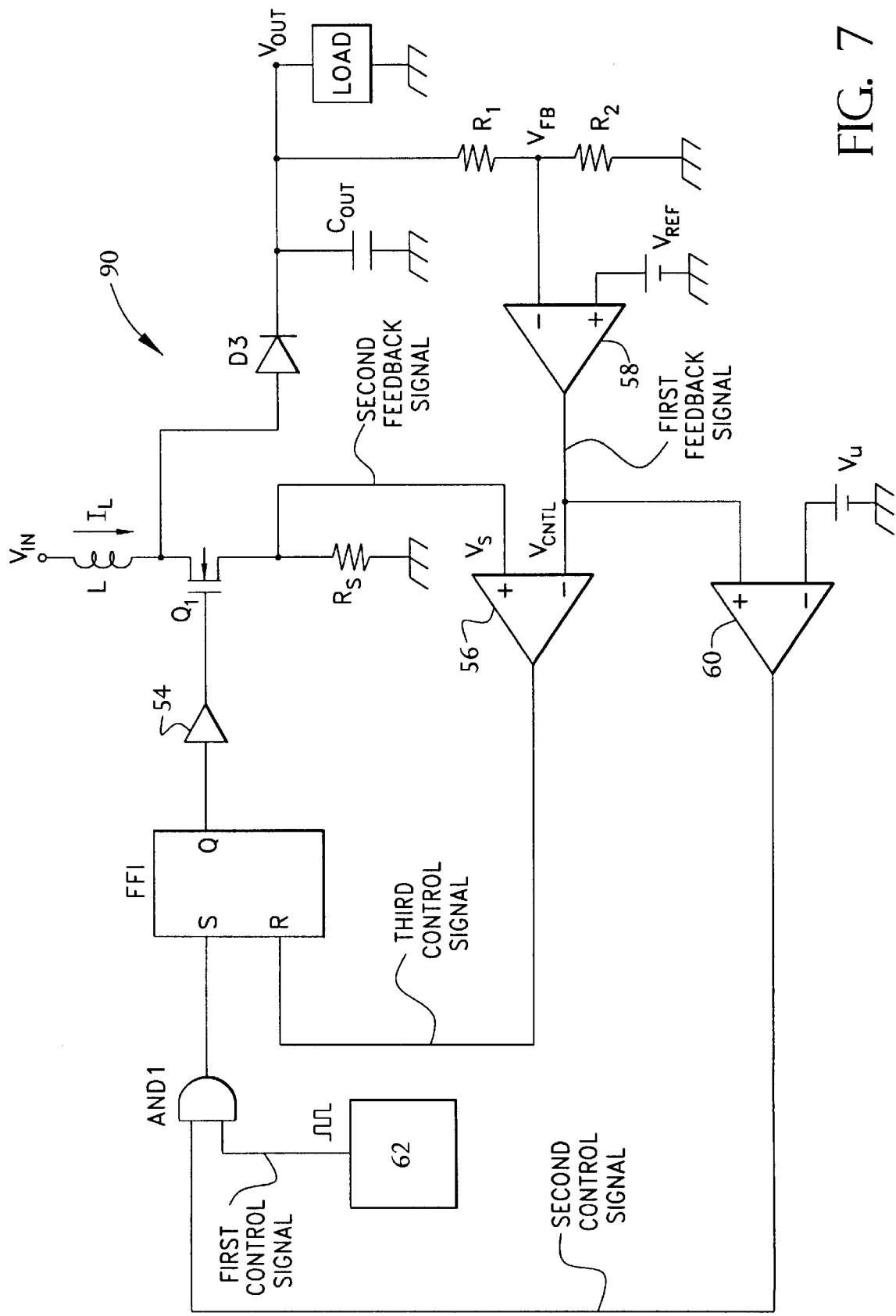
FIG. 7 illustrates a fixed frequency DC to DC boost (up) converter in accordance with a third embodiment of the invention.

FIG. 7 illustrates a fixed frequency DC to DC boost (up) converter 90 in accordance with a third embodiment of the invention. This embodiment is identical to the down converter embodiment of FIG. 3 except that the switch 52 and rectifying diode D1 are replaced by switching transistor Q1 and rectifying diode D3, respectively, and in that inductor L and sensing resistor $R_s$ are rearranged. In particular, when Q1 is ON, current $I_L$ flows through inductor L to store energy in inductor L. A voltage across sensing resistor $R_s$ is also provided as a feedback voltage signal $V_s$ to an input of comparator 56 as representative of the current through the inductor L. When Q1 is OFF, rectifying diode D3 passes stored energy in inductor L to the output capacitor $C_{out}$ and also prevents current from flowing back to $V_{in}$ through inductor L.

Figure 8:
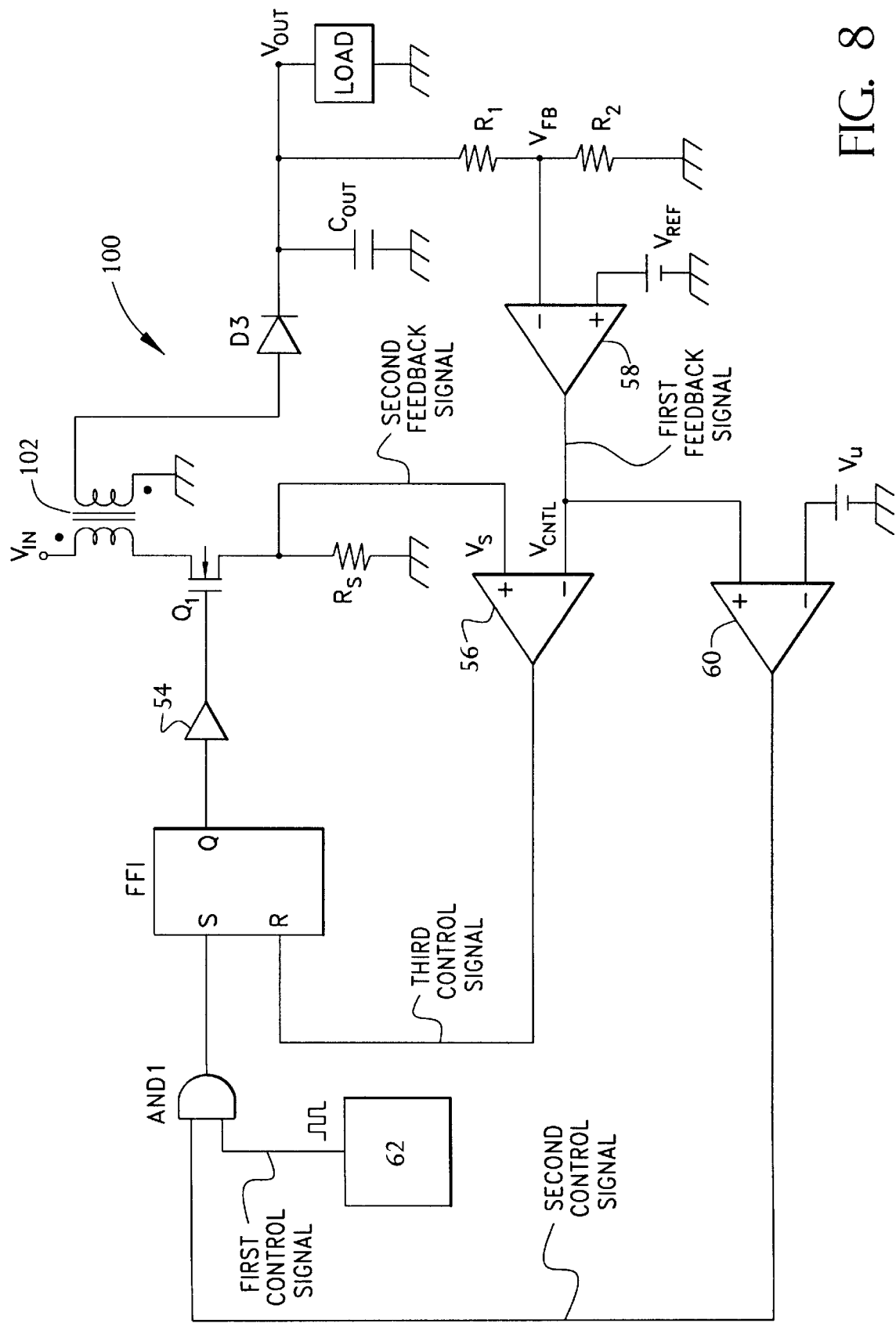
FIG. 8 illustrates a fixed frequency DC to DC buck boost (up/down) converter in accordance with a fourth embodiment of the invention.

FIG. 8 illustrates a fixed frequency DC to DC buck boost (up/down) converter 100 in accordance with a fourth embodiment of the invention. This embodiment is identical to the boost converter embodiment of FIG. 7 except that inductor L is replaced by a transformer 102 having a first winding connected between the input voltage $V_{IN}$ and switching transistor Q1 and a second winding connected between ground and the rectifying diode D3. In a conventional manner, the connecting points along the winding determine whether the input voltage $V_{IN}$ is to be stepped down or stepped up. Depending upon the selection, the operation is then the same as that described above with respect to FIG. 3 or as described above with respect to FIG. 7.

Those skilled in the art will appreciate that it is desired to select circuit elements which will minimize the ripple current and which will lead to stability of the circuit control system. The selection of the appropriate circuit values is believed to be well within the level of skill of those skilled in the art.

Although an exemplary embodiment of the invention has been described in detail above, those skilled in the art will readily appreciate that many additional modifications are possible in the exemplary embodiment without materially departing from the novel teachings and advantages of the invention. For example, the invention is intended to cover the various known switching circuit and rectifying circuit configurations for down converters, up converters, and buck-boost converters, as well as all combinations of such configurations. Accordingly, these and all such modifications are intended to be included within the scope of this invention as defined in the following claims.

What is claimed is:

1. A switching voltage regulator comprising:
   an output terminal connected to a load;
   an output circuit including an inductor for storing energy and an output capacitor coupled to said output terminal which supplies a regulated voltage to said output terminal;
   a switch coupled to said inductor so as to alternate an input voltage applied to said inductor in response to a switching control signal;
   a rectifying circuit coupled to said inductor so as to freewheel current in said inductor and substantially prevent a reverse current through said inductor from said output terminal; and
   a switching control circuit which provides said switching control signal to said switch so as to maintain said regulated voltage to said output terminal, said switching control circuit comprising:
      a first circuit which monitors a voltage provided to said output terminal and generates a first feedback signal which indicates a target inductor current for providing the regulated voltage to the output terminal,
      a second circuit which monitors an inductor current output by said inductor to said output terminal and generates a second feedback signal which indicates the inductor current,
      a logic circuit with first, second and third input terminals for receiving first, second, and third control signals, respectively, and at least one output terminal for outputting said switching control signal to close said switch when said first and second control signals are active and for outputting said switching control signal to open said switch when said third control signal is active,
      a pulse generating circuit for providing said first control signal to said first input terminal of said logic circuit,
      a third circuit which provides said third control signal to said third input of said logic circuit in response to said first and second feedback signals, said third control signal being active when said second feedback signal has a greater value than said first feedback signal, and
      a fourth circuit responsive to said first feedback signal so as to provide said second control signal to said second input of said logic circuit, said second control signal being active when said first feedback signal has a value greater than a predetermined value.

2. A switching voltage regulator as in claim 1, wherein said switching control circuit further comprises a low pass filter which filters said first feedback signal so as to dynamically adjust a minimum peak inductor current through said inductor.

3. A switching voltage regulator as in claim 1, wherein said switching voltage regulator is a step down voltage regulator, whereby said regulated voltage is less than said input voltage.

4. A switching voltage regulator as in claim 3, wherein said switch is coupled between said input voltage and a junction of said rectifying circuit and one end of said inductor, and another end of said inductor is connected to said output terminal.

5. A switching voltage regulator as in claim 4, wherein said rectifying circuit comprises a diode connected between ground and said inductor.

6. A switching voltage regulator as in claim 4, wherein said rectifying circuit comprises:
   a switching transistor connected between ground and said junction of said rectifying circuit and said inductor;
   a comparator which compares one of a voltage across said switching transistor and said second feedback signal to a zero crossing reference voltage to generate a reverse polarity signal which indicates the polarity of said inductor current; and
   a gate responsive to said reverse polarity signal and a driving signal from said logic circuit so as to disable said switching transistor when said reverse polarity signal indicates that said inductor current is flowing from said output terminal to said inductor and to switch said switching transistor in inverse phase with said switch when said reverse polarity signal indicates that said inductor current is flowing to said output terminal from said inductor.

7. A switching voltage regulator as in claim 1, wherein said logic circuit comprises an AND gate which receives said first and second control signals at first and second inputs thereof, and an RS flip-flop which receives an output of said AND gate at a set input thereof and said third control signal at a reset input thereof.

8. A switching voltage regulator as in claim 1, wherein said pulse generating circuit comprises an oscillator.

9. A switching voltage regulator as in claim 1, wherein said pulse generating circuit comprises a constant OFF time one-shot responsive to said third control signal from said third circuit to provide a constant duration duty cycle pulse to said first input terminal of said logic circuit.

10. A switching voltage regulator as in claim 1, wherein said switching voltage regulator is a step up voltage regulator, whereby said regulated voltage is greater than said input voltage.

11. A switching voltage regulator as in claim 10, wherein one end of said inductor is connected to said input voltage and another end of said inductor is connected to said rectifying circuit, and said switch is connected between ground and said rectifying circuit.

12. A switching voltage regulator as in claim 11, wherein said rectifying circuit comprises a diode connected between said output terminal and a junction connecting one end of said inductor with said switch.

13. A switching voltage regulator as in claim 1, wherein said switching voltage regulator is a buck-boost voltage regulator, whereby said regulated voltage is selectively less than or greater than said input voltage.

14. A switching voltage regulator as in claim 13, wherein said inductor comprises a transformer with a first winding connected between said input voltage and said switch and with a second winding connected between ground and said rectifying circuit.

15. A switching voltage regulator as in claim 14, wherein said rectifying circuit comprises a diode connected between said output terminal and said second winding of said transformer.

16. A switching voltage regulator comprising:
    an output terminal connected to a load;
    an output circuit including an inductor for storing energy and an output capacitor coupled to said output terminal which supplies a regulated voltage to said output terminal;
    switching means coupled to said inductor for alternating an input voltage applied to said inductor in response to a switching control signal;
    rectifying means coupled to said inductor for freewheeling current in said inductor and substantially preventing a reverse current through said inductor from said output terminal; and
    switching control means for providing said switching control signal to said switching means so as to maintain said regulated voltage to said output terminal, said switching control means comprising:
        means for monitoring a voltage provided to said output terminal and for generating a first feedback signal which indicates a target inductor current for providing the regulated voltage to the output terminal,
        driving means responsive to said first feedback signal for selectively supplying driving pulses to said switching means as said switching control signal so as to control duty cycle switching of said switching means, and for varying a frequency of said switching by said switching means by an amount proportional to a current through said inductor when said first feedback signal has a value greater than a predetermined threshold, and
        a low pass filter which filters said first feedback signal so as to dynamically adjust a minimum peak inductor current through said inductor.

17. A switching voltage regulator as in claim 16, wherein said switching voltage regulator is a step down voltage regulator, whereby said regulated voltage is less than said input voltage.

18. A switching voltage regulator as in claim 17, wherein said switching means is coupled between said input voltage and a junction of said rectifying means and one end of said inductor and another end of said inductor is connected to said output terminal.

19. A switching voltage regulator as in claim 18, wherein said rectifying means comprises a diode connected between ground and said inductor.

20. A switching voltage regulator as in claim 18, wherein said rectifying means comprises:
    a switching transistor connected between ground and a junction of said rectifying means and said inductor;
    means for comparing one of a voltage across said switching transistor and a second feedback signal indicating current in said inductor to a zero crossing reference voltage and for generating a reverse polarity signal which indicates the polarity of said inductor current; and
    gating means responsive to said reverse polarity signal and a driving signal from said driving means for disabling said switching transistor when said reverse polarity signal indicates that said inductor current is flowing from said output terminal to said inductor and for switching said switching transistor in inverse phase with said switching means when said reverse polarity signal indicates that said inductor current is flowing to said output terminal from said inductor.

21. A switching voltage regulator comprising:
    an output terminal connected to a load;
    an output circuit including an inductor for storing energy and an output capacitor coupled to said output terminal which supplies a regulated voltage to said output terminal;
    switching means coupled to said inductor for alternating an input voltage applied to said inductor in response to a switching control signal;
    rectifying means coupled to said inductor for freewheeling current in said inductor and substantially preventing a reverse current through said inductor from said output terminal; and
    switching control means for providing said switching control signal to said switching means so as to maintain said regulated voltage to said output terminal, said switching control means comprising:
        means for monitoring a voltage provided to said output terminal and for generating a first feedback signal which indicates a target inductor current for providing the regulated voltage to the output terminal, and
        driving means responsive to said first feedback signal for selectively supplying driving pulses to said switching means as said switching control signal so as to control duty cycle switching of said switching means, and for varying a frequency of said switching by said switching means by an amount proportional to a current through said inductor when said first feedback signal has a value greater than a Predetermined threshold, said driving means comprising:
            means for monitoring an inductor current output by said inductor to said output terminal and for generating a second feedback signal which indicates the inductor current,
            gating means responsive to first, second, and third control signals for outputting said switching control signal to close said switching means when said first and second control signals are active and for outputting said switching control signal to open said switching means when said third control signal is active, pulse generating means for providing said first control signal to said gating means, means for providing said third control signal to said gating means in response to said first and second feedback signals, said third control signal being active when said second feedback signal has a greater value than said first feedback signal, and means responsive to said first feedback signal for providing said second control signal to said gating means, said second control signal being active when said first feedback signal has a value greater than a predetermined value.

22. A switching voltage regulator as in claim 21, wherein said gating means comprises an AND gate which receives said first and second control signals at first and second inputs thereof, and an RS flip-flop which receives an output of said AND gate at a set input thereof and said third control signal at a reset input thereof.

23. A switching voltage regulator as in claim 22, wherein said pulse generating means comprises an oscillator.

24. A switching voltage regulator as in claim 22, wherein said pulse generating means comprises a constant OFF time one-shot responsive to said third control signal from said third control signal providing means so as to provide a constant duration duty cycle pulse to said first input of said AND gate.

25. A switching voltage regulator comprising:

an output terminal connected to a load;

an output circuit including an inductor for storing energy and an output capacitor coupled to said output terminal which supplies a regulated voltage to said output terminal;

switching means coupled to said inductor for alternating an input voltage applied to said inductor in response to a switching control signal;

rectifying means coupled to said inductor for freewheeling current in said inductor and substantially preventing a reverse current through said inductor from said output terminal; and switching control means for providing said switching control signal to said switching means so as to maintain said regulated voltage to said output terminal, said switching control means comprising:

means for monitoring a voltage provided to said output terminal and for generating a first feedback signal which indicates a target inductor current for providing the regulated voltage to the output terminal, and driving means responsive to said first feedback signal for selectively supplying driving pulses to said switching means as said switching control signal so as to control duty cycle switching of said switching means, and for varying a frequency of said switching by said switching means by an amount proportional to a current through said inductor when said first feedback signal has a value greater than a predetermined threshold, wherein said switching voltage regulator is a step up voltage regulator, whereby said regulated voltage is greater than said input voltage.

26. A switching voltage regulator as in claim 25, wherein one end of said inductor is connected to said input voltage and another end of said inductor is connected to said rectifying means, and said switching means is connected between ground and said rectifying means.

27. A switching voltage regulator as in claim 26, wherein said rectifying means comprises a diode connected between said output terminal and a junction connecting one end of said inductor with said switching means.

28. A switching voltage regulator comprising:

an output terminal connected to a load;

an output circuit including an inductor for storing energy and an output capacitor coupled to said output terminal which supplies a regulated voltage to said output terminal;

switching means coupled to said inductor for alternating an input voltage applied to said inductor in response to a switching control signal;

rectifying means coupled to said inductor for freewheeling current in said inductor and substantially preventing a reverse current through said inductor from said output terminal; and switching control means for providing said switching control signal to said switching means so as to maintain said regulated voltage to said output terminal, said switching control means comprising:

means for monitoring a voltage provided to said output terminal and for generating a first feedback signal which indicates a target inductor current for providing the regulated voltage to the output terminal, and driving means responsive to said first feedback signal for selectively supplying driving pulses to said switching means as said switching control signal so as to control duty cycle switching of said switching means, and for varying a frequency of said switching by said switching means by an amount proportional to a current through said inductor when said first feedback signal has a value greater than a predetermined threshold, wherein said switching voltage regulator is a buck-boost voltage regulator, whereby said regulated voltage is selectively less than or greater than said input voltage.

29. A switching voltage regulator as in claim 28, wherein said inductor comprises a transformer with a first winding connected between said input voltage and said switching means and with a second winding connected between ground and said rectifying means.

30. A switching voltage regulator as in claim 29, wherein said rectifying means comprises a diode connected between said output terminal and said second winding of said transformer.

31. A method of controlling a switching voltage regulator comprising an output terminal connected to a load, an output circuit including an inductor for storing energy and an output capacitor coupled to said output terminal which supplies a regulated voltage to said output terminal, switching means coupled to said inductor for alternating an input voltage applied to said inductor in response to a switching control signal, and rectifying means coupled to said inductor for freewheeling current in said inductor and substantially preventing a reverse current through said inductor from said output terminal, said method comprising the steps of:

monitoring a voltage Provided to said output terminal and for generating a first feedback signal which indicates a target inductor current for providing the regulated voltage to the output terminal;

selectively supplying driving pulses to control duty cycle switching of said switching means so as to maintain said regulated voltage to said output terminal in accordance with said first feedback signal;

varying a frequency of said switching by said switching means by an amount proportional to a load current when said first feedback signal has a value less than a predetermined threshold; and low pass filtering said first feedback signal so as to dynamically adjust a minimum peak inductor current through said inductor.

32. A method as in claim 31, wherein said step of selectively supplying driving pulses to said switching means comprises the step of providing driving pulses from an oscillator to said switching means.

33. A method as in claim 32, wherein said step of varying said frequency of said switching comprises the step of blocking the provision of driving pulses from said oscillator to said switching means when said first feedback signal has a value less than said predetermined threshold.

34. A method as in claim 31, wherein said step of selectively supplying driving pulses to said switching means comprises the step of providing constant duration duty cycle pulses to said switching means.

35. A method as in claim 34, wherein said step of varying said frequency of said switching comprises the step of blocking the provision of said constant duration duty cycle pulses to said switching means when said first feedback signal has a value less than said predetermined threshold.

* * * * *